United States Patent [19]

Behrenz et al.

[11] 4,094,970
[45] June 13, 1978

[54] ELASTOMERIC POLYURETHANE-BASED ARTICLES HAVING AN INSECTICIDAL DEPOT GAS ACTION

[75] Inventors: Wolfgang Behrenz, Overath-Steinenbrueck; Dietmar Schäpel, Cologne; Manfred Dahm, Leverkusen, all of Germany

[73] Assignee: Bayer Aktiengesellschaft, Leverkusen, Germany

[21] Appl. No.: 714,077

[22] Filed: Aug. 12, 1976

[30] Foreign Application Priority Data

Aug. 26, 1975 Germany .............................. 2537894

[51] Int. Cl.$^2$ .................... A01N 9/36; A61K 31/74
[52] U.S. Cl. ..................................... 424/78; 424/219; 424/224
[58] Field of Search ..................... 424/78, 219, 224; 260/77.5 AR, 77.5 AM, 2.5 AJ

[56] References Cited

U.S. PATENT DOCUMENTS

| | | | |
|---|---|---|---|
| 3,318,769 | 5/1967 | Folckemer et al. ................. | 424/219 |
| 3,398,225 | 8/1968 | Bellin ................................ | 424/34 |
| 3,428,578 | 2/1969 | Merten et al. ................. | 260/77.5 AR |
| 3,476,933 | 10/1966 | Mendelsohn ...................... | 260/2.5 |
| 3,692,707 | 9/1972 | Pruit et al. ................... | 260/77.5 AR |
| 3,740,377 | 6/1973 | Huffman et al. ............. | 260/77.5 AM |
| 3,791,914 | 2/1974 | Ammons et al. ............. | 260/77.5 AR |
| 3,849,556 | 11/1974 | Wolff et al. ............................ | 424/78 |
| 3,852,416 | 12/1974 | Grubb et al. ............................ | 424/78 |
| 3,879,501 | 4/1975 | Buisson ........................ | 260/77.5 AR |

*Primary Examiner*—Albert T. Meyers
*Assistant Examiner*—D. W. Robinson
*Attorney, Agent, or Firm*—Burgess, Dinklage & Sprung

[57] ABSTRACT

In an insecticidal article comprising an insecticidally effective amount of at least one volatile phosphoric or thiophosphoric acid ester and a solid polyurethane carrier material, the improvement wherein said polyurethane is an elastomeric polyurethane, whereby the article retains its activity over a long period of time. The polyurethane is formed of a polyisocyanate and a mixture of a long chain polyol and a short chain polyol and/or polyamine.

5 Claims, No Drawings

ELASTOMERIC POLYURETHANE-BASED ARTICLES HAVING AN INSECTICIDAL DEPOT GAS ACTION

This invention relates to insecticidal preparations based on elastomeric polyurethanes containing as their active ingredient one or more volatile insecticidal phosphoric acid esters which automatically act as fumigants in the gaseous phase.

Volatile phosphoric acid esters are among the most powerful insecticides and the best known among them is O,O-dimethyl-O-(2,2-dichlorovinyl)-phosphoric acid ester, which will hereinafter be referred to as DDVP for convenience. This product is used world-wide in the manufacture of solid insecticides in which the high volatility of DDVP is utilized to produce a long lasting toxic atmosphere for insects in closed rooms.

Although the high volatility is very advantageous for this purpose, it is equally disadvantageous for obtaining a sufficiently long-lasting insecticidal action. DDVP disappears from a room so rapidly that only one to two hours after application of the active ingredient insects may again enter the room without being destroyed. Another disadvantage of DDVP is that it hydrolyzes rapidly and is thereby rendered inactive. This also reduces its long-lasting effect as respiratory toxin.

Numerous attempts have therefore been made to control the evaporation of DDVP into a room so that it takes place quite gradually in doses which are insecticidal, but harmless to the human organism, and at the same time to protect the active ingredient against hydrolytic decomposition.

The following is a quotation from German Auslegeschrift No. 1,207,144, column 1, lines 20 to 24, referring to such experiments:

"Long acting preparations are difficult to produce, not only on account of the high sensitivity of DDVP to moisture, but also on account of its incompatibility with many carriers."

In the aforesaid Auslegeschrift it has also been disclosed that the device of mixing DDVP with montan wax is not sufficient on its own to solve the problem of obtaining a long-lasting, uniform insecticidal action since virtually no evaporation of active ingredient takes place from such mixtures. Even after 4 weeks storage at room temperature they still contain practically the same amount of active ingredient, and they are therefore useless for the purpose. In German Auslegeschrift No. 1,207,144 there are therefore claimed fumigants having a long-lasting insecticidal action, consisting of a combination of DDVP as active ingredient, a montan wax and hydrogenated cotton seed oil or dibutyl phthalate. These formulations have, however, the disadvantage that, when in use, a mixture of DDVP and plasticizer drips from them so that it is doubtful whether they would be acceptable from a hygienic and toxicological point of view.

Experiments have also been carried out to impregnate natural products with DDVP. British Pat. No. 1,072,218, for example, claims an evaporation container for DDVP, made of wood having a moisture content of less than 8%. The disadvantages of applying the insecticide in such a form are obvious. Natural products are never uniform in their consistency. This applies particularly to a material, such as wood, which varies so greatly in its structure.

It is also known to produce shaped masses based on thermoplastic or duroplastic resins which contain DDVP.

Shaped masses having a long-lasting insecticidal action have been described in German Auslegeschrift No. 1,230,259. These products are characterized by a combination of a volatile insecticidal organic phosphorus compound of a certain composition and thermoplastic resin, such as polyvinyl chloride or copolymers containing vinyl chloride. The disadvantages of using thermoplastic resins as carriers for DDVP will be explained below with reference to its most important representative, polyvinyl chloride. As already mentioned in the aforesaid Auslegeschrift, the capacity of polyvinyl chloride to absorb DDVP is limited in spite of the fact that the phosphoric acid ester has certain plasticizing effects on the synthetic resin. Thus, for example, mixtures of polyvinyl chloride powder which contain 25% of DDVP are wet (see column 5, line 65 of German Auslegeschrift No. 1,230,259). Experiments show that formulations of polyvinyl chloride and DDVP alone are unsuitable since they fail to liberate sufficient active ingredient after only a short time. It is therefore necessary to add considerable quantities of plasticizers to such mixtures in the same way as in the case of the montan wax formulations described in German Auslegeschrift No. 1.207,144. This again has its difficulties since the addition of plasticizer must be effected at the expense of the active ingredient content. Molded polyvinyl chloride products containing 20% of plasticizer and 18% of DDVP, for example, exude considerable quantities of a mixture of plasticizer and active ingredients when stored in gas-tight packages and when in use. In view of the corrosive nature of this mixture, this property is a serious disadvantage and raises serious objections on toxicological grounds. On the other hand, since polyvinyl chloride may only absorb limited quantities of DDVP and plasticizer, this disadvantage could only be overcome by reducing the amount of active ingredient or of plasticizer or of both in the formulations. A reduction in the DDVP content would directly reduce the insecticidal action while a reduction in plasticizer content would reduce the diffusion of active ingredient and hence again impair the insecticidal action. It has therefore been recommended that when using solid insecticides composed of polyvinyl chloride, DDVP and plasticizer, they should be placed inside a cardboard frame to catch the drips of the mixture of active ingredient and plasticizer when in use.

It must be regarded as another disadvantage of formulations of DDVP and polyvinyl chloride that even when they contain the maximum quantity of plasticizer, which is 20%, a considerable proportion of the active ingredient fails to reach the surface and is therefore ineffective.

Lastly, it must also be taken into account that the manufacture of molded products of polyvinyl chloride, plasticizer and DDVP requires a considerable outlay in apparatus since the mixture must be extruded, which requires the appropriate machinery. Since, moreover, manufacture of the molded products takes place at high temperatures (from 170° to 180° C), some loss of active ingredient occurs, which again requires extensive protective measures for the operators involved.

Many of the disadvantages occurring when thermoplasts are used as carrier materials may be obviated by using duroplastic resins as carriers.

Molded product consisting of DDVP and duroplasts based on urea-formaldehyde or melamine-formaldehyde, epoxides, polyurethanes and copolymers of vinyl compounds have been disclosed in French Pat. No. 1,326,385.

Molded products based on duroplastic resins are, however, also not completely satisfactory in their effect. The problem is that the surface of such molded products very rapidly loses active ingredient and due to the cage effect of three-dimensionally cross-linked duromers there is practically no or too little diffusion of active ingredient to the surface from the underlying layers.

Thus, it is clear from Swiss Pat. No. 289,915, that duroplasts are not suitable carrier materials for the liberation of insecticides in the gaseous phase.

A solution to this problem is indicated in German Auslegeschrift No. 1,694,240 where it is proposed that one or more solid fillers, in particular glass fibers, should be added to the components which give rise to a duroplast from an unsaturated polyester and a vinyl compound which is attached to it by polymerization in the presence of DDVP.

It has been proved that such molded products based on duroplastic resins have a better action that the products described in German Auslegeschrift No. 1,230,259. However, they still have numerous disadvantages. In particular, these carrier materials still retain too much active ingredient even when considerable quantities of fillers have been used in their preparation.

The utilization of active ingredient is therefore not optimal, that is to say a large quantity of active ingredient is left behind in the carrier material and cannot be given off to the surroundings.

Furthermore, these materials have a characteristic odor due to the incompleteness of the reaction between the vinyl compounds and unsaturated polyester. When the monomer used is styrene, which is most frequently the case, the odor is extremely unpleasant. The incorporation of solid filler into the reaction mixture, which is essential for the action of the product, also entails numerous process technical disadvantages in the manufacture of the molded products, such as sedimentation and inhomogeneous impregnation of the filler or fillers. Moreover, the addition of fillers, such as glass fibers, considerably increases the cost of the molded products.

It has also been disclosed in the aforesaid German Auslegeschrift No. 1,230,259 to use thermoplastic and duroplastic polyurethane as carrier materials for insecticidal compositions which contain DDVP. The disadvantages of thermoplasts and duroplasts mentioned above are equally applicable to these thermoplastic and duroplastic carrier materials, based on polyurethanes.

It has now surprisingly been found that materials which have an insecticidal depot gas action, but are free from the disadvantages inherent in the previous carrier materials may be obtained by using elastomeric polyurethanes.

The term "elastomers" is used herein in accordance with present day usage and scientific knowledge (for example P. I. Flory, Principles of Polymer Chemistry, Cornell University Press, Ithaca, N.Y. 1953) to mean elastomeric materials which may be highly stretched and return to almost their original state after release of the stretching force. This elastic behavior is regarded as such an important property of polymers that elastomers are treated as a separate group of polymer substances side-by-side with thermoplasts and duroplasts. They are distinguished by the fact that long polymer chains having internal mobility are cross-linked by short chain links and, in addition, associations take place between segments of the long chains to ensure further cross-linking. Elastomers are therefore classified as intermediate between thermoplasts and duroplasts.

Since elastomers resemble duroplasts in being three-dimensionally cross-linked products, they could no more be expected than duroplasts to give rise to products with an insecticidal depot gas action without the use of fillers. In fact, those skilled in the art would naturally assume that such materials would be completely unsuitable for the construction of carrier materials which would be insecticidally effective.

The present invention therefore relates to preparations having a depot gas action which contain an elastomeric polyurethane as carrier material and volatile insecticidal phosphoric acid or thiophosphoric acid esters as fumigants which automatically act as such in the gaseous phase.

The present invention also relates to a process for the production of preparations having an insecticidal depot gas action, characterized in that mixtures of long chain polyols and short chain polyols and/or polyamines are reacted with polyisocyanates in the presence of volatile insecticidal phosphoric or thiophosphoric acid esters and optionally other additives.

It has been found that elastomeric polyurethanes have numerous surprising advantages over duroplasts, such as unsaturated polyester resins, in their use as carrier materials for the production of preparations which have an insecticidal depot gas action:

1. By virtue of the variability of its structure, the carrier material may be adjusted optimally to the nature of the volatile insecticidal phosphoric or thiophosphoric acid ester so that better utilization of the active ingredient may always be achieved.
2. The preparations obtainable according to the present invention have a better action.
3. The solid end products are free from any unpleasant characteristic odor and may therefore be scented with any perfume.
4. They have a better absorption capacity for volatile insecticidal phosphoric acid esters.
5. Elastomeric polyurethanes may easily be foamed so that solid products with a low unit weight ($kg/cm^3$) may be produced.
6. A powerful and long-lasting insecticidal action may be obtained without the incorporation of solid or liquid fillers although the action may be even further improved by the addition of such fillers.

To produce the insecticidal preparations according to the present invention, a mixture of volatile insecticidal phosphoric acid esters, a long chain polyol, a short chain polyol and/or polyamine and a polyisocyanate is cured, optionally in the presence of additives.

The polyisocyanates used according to the present invention may be aliphatic, cycloaliphatic, araliphatic, aromatic or heterocyclic polyisocyanates, for example those described by W. Siefgen in Justus Liebigs Annalen der Chemie, 562, pages 75 to 136. The following are specific examples: ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and mixtures of these isomers, 1-isocyanato-3,3,5-trimethyl-5-isocyanatomethylcyclohexane (German AS No. 1,202,785), hexahydrotolylene-2,4- and -2,6- diisocyanate and mixtures of these isomers, hexahydrophenylene-1,3- and/or -1,4-diisocyanate, perhydrodiphenylmethane-2,4'- and/or -4,4'-diisocyanate, phenylene-1,3- and -1,4-diisocyanate, tolylene-2,4- and -2,6-diisocyanate and mixtures of these isomers, diphenylmethane-2,4'- and/or 4,4'-diisocyanate, naphthylene-1,5-diisocyanate, triphenylmethane-4,4,4''-triisocyanate, polyphenyl-polymethylene-polyisocyanates such as may be obtained by aniline-formaldehyde condensation followed by phosgenation as described, e.g. in British Pat. Nos. 874,430 and 848,671, perchlorinated aryl polyisocyanates as described, e.g. in German Auslegeschrift No. 1,157,601, polyisocyanates having carbodiimide groups as described in German Pat. No. 1,092,007, diisocyanates of the type described in U.S. Pat. No. 3,492,330, polyisocyanates having allophanate groups as described, e.g. in British Pat. No. 994,890, Belgian Pat. No. 761,626 and published Dutch Patent Application No. 7,102,524, polyisocyanates having isocyanurate groups as described, e.g. in German Pat. Nos. 1,022,789; 1,222,067 and 1,027,394 and in German Offenlegungsschrift Nos. 1,929,034 and 2,004,048, polyisocyanates having urethane groups as described, e.g. in Belgian Pat. No. 752,261 or in U.S. Pat. No. 3,394,164, polyisocyanates having acylated urea groups according to German Pat. No. 1,230,778, polyisocyanates having biuret groups as described, e.g. in German Pat. No. 1,101,394, in British Pat. No. 889,050 and in French Pat. No. 7,017,514, polyisocyanates prepared by telomerization reactions as described, e.g. in Belgian Pat. No. 723,640, polyisocyanates having ester groups, for example those mentioned in British Pat. Nos. 956,474 and 1,072,956, in U.S. Pat. No. 3,567,763 and in German Pat. No. 1,231,688 and reaction products of the above-mentioned isocyanates with acetals according to German Pat. No. 1,072,385.

The distillation residues obtained from the commercial production of isocyanates, which still contain isocyanate groups, may also be used, optionally as solutions in one or more of the above-mentioned polyisocyanates. Mixtures of the above-mentioned polyisocyanates may also be used.

It is generally preferred to use commercially readily available polyisocyanates, such as tolylene-2,4- and -2,6-diisocyanate and mixtures of these isomers ("TDI"), polyphenyl-polymethylene polyisocyanates which may be obtained by the condensation of aniline and formaldehyde followed by phosgenation ("crude MDI") and polyisocyanates which contain carbodiimide groups, urethane groups, allophanate groups, isocyanurate groups, urea groups or biuret groups ("modified polyisocyanates").

The starting components used also include long chain polyols which generally have a molecular weight of about 1000 to 10,000, preferably about 2000 to 5000 and which contain at least two hydrogen atoms capable of reacting with isocyanates. The polyols of this type used in the present invention may include compounds containing amino groups, thiol groups or carboxyl groups, but are preferably polyhydroxyl compounds, in particular compounds containing from 2 to 8 hydroxyl groups and especially those having a molecular weight of about 800 to 10,000 and preferably about 1000 to 6000, e.g. polyesters, polyethers, polythioethers, polyacetals, polycarbonates or polyester amides containing at least two, generally from 2 to 8 and preferably from 2 to 4 hydroxyl groups, of the type which are known for the production of both homogeneous and cellular polyurethanes.

The hydroxyl polyesters used may be, for example, reaction products of polyhydric alcohols, preferably dihydric alcohols with the optional addition of trihydric alcohols, and polybasic, preferably dibasic carboxylic acids. Instead of using free polycarboxylic acids, the corresponding polycarboxylic acid anhydrides or esters of lower alcohols or mixtures thereof may be used for the preparation of the polyesters. The polybasic carboxylic acids may be aliphatic, cycloaliphatic, aromatic and/or heterocyclic and may be substituted, e.g. by halogen atoms, and/or be unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optimally mixed with monomeric fatty acids, dimethyl terephthalate or bisglycol terephthalate. The following are examples of polyhydric alcohols which may be used: ethylene glycol, propylene -1,2- and -1,3-glycol, butylene-1,4- and -2,3-glycol, hexane-1,6-diol, octane-1,8-diol, neopentyl glycol, cyclohexane dimethanol (1,4-bis-hydroxymethylcyclohexane), 2-methyl-1,3-propane diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycol, dipropylene glycol, polypropylene glycol, dibutylene glycol and polybutylene glycols. The polyesters may contain a proportion of carboxyl end groups. Polyesters of lactones, such as $\epsilon$-caprolactone, or hydroxycarboxylic acids, such as $\omega$-hydroxycaproic acid, may also be used.

The polyethers which may be used according to the present invention, which contain at least two, generally from two to eight and preferably two or three hydroxyl groups, are also known and may be prepared, for example, by the polymerization of epoxides, such as ethylene oxide, propylene oxide, butylene oxide, tetrahydrofuran, styrene oxide or epichlorohydrin, either each on its own, for example in the presence of $BF_3$, or by the addition of these epoxides, optionally as mixtures or successively, to starting components with reactive hydrogen atoms, such as alcohols or amines, e.g. water, ethylene glycol, propylene-1,3- or -1,2-glycol, trimethylolpropane, 4,4'-dihydroxy-diphenyl-propane, aniline, ammonia, ethanolamine and ethylene diamine. Sucrose polyethers may also be used according to the present invention, for example those described in German Auslegeschrift Nos. 1,176,358 and 1,064,938. It is frequently preferred to use polyethers which contain predominantly primary OH groups (up to 90%, by weight, based on all the OH groups present in the polyether). Polyethers modified by vinyl polymers, for example the compounds obtained by the polymerization of styrene or acrylonitrile in the presence of polyethers (U.S. Pat. Nos. 3,383,351; 3,304,273; 3,523,093 and 3,110,695 and German Pat. No. 1,152,536) are also suitable, as are polybutadienes containing OH groups.

Among the polythioethers may be mentioned in particular the condensation products of thiodiglycol on its own and/or with other glycols, dicarboxylic acids, formaldehyde, aminocarboxylic acids or amino alcohols. The products obtained are polythio mixed ethers, polythioether esters or polythio ether ester amides, depending on the co-components.

Suitable polyacetals include, for example, the compounds which may be prepared from glycols, such as diethylene glycol, triethylene glycol, 4,4'-dioxethoxydiphenyldimethyl methane and hexanediol, and formaldehyde. Polyacetals suitable for the purpose of the present invention may also be prepared by the polymerization of cyclic acetals.

The hydroxyl polycarbonates used are also known and may be obtained, for example, by the reaction of diols, such as propane-1,3-diol, butane-1,4-diol and/or hexane-1,6-diol, diethyleneglycol, triethylene glycol or tetraethylene glycol, with diarylcarbonates, e.g. diphenyl carbonate, or phosgene.

Suitable polyester amides and polyamides include, for example, the predominantly linear condensates obtained from saturated and unsaturated carboxylic acids or their anhydrides and polyvalent saturated and unsaturated amino alcohols, diamines, polyamine and mixtures thereof.

Polyhydroxyl compounds already containing urethane or urea groups and modified or unmodified natural polyols, such as castor oil, carbohydrates or starch, are also suitable. Addition products of alkylene oxides with phenol-formaldehyde resins or with urea-formaldehyde resins may also be used according to the present invention.

Representatives of these compounds to be used according to the present invention have been described, for example, in High Polymers, Vol.XVI, "Polyurethanes, Chemistry and Technology" by Saunders-Frisch, Interscience Publishers, New York, London, Volume I, 1962, pages 32 – 42 and pages 44 – 54 and Volume II, 1964, pages 5 – 6 and 198 – 199 and in Kunststoff-Hnadbuch VII, Vieweg-Hochtlen, Carl-Hanser-Verlag, Munich, 1966, e.g. on pages 45 – 71.

Other starting components for the process according to the present invention include short chain alcohols, amino glycols, phenols and amines containing at least two hydrogen atoms capable of reacting with isocyanates and having a molecular weight of about 62 to 1000 and preferably about 48 to 300.

The following are examples of such compounds: ethylene glycol, diethylene glycol, polyethylene glycol, propane-1,2-diol, propane-1,3-diol, butane-1,4-diol, hexane-1,6-diol, decane-1,10-diol, butyne-2-diol-(1,4), glycerol, butane-2,4-diol, hexane-1,3,6-triol, trimethylolpropane, resorcinol, hydroquinone, 4,6-di-tert.-butyl-pyrocatechol, 3-hydroxy-2-naphthol, 6,7-dihydroxy-1-naphthol, 2,5-dihydroxy-1-naphthol, 2,2-bis-(p-hydroxyphenyl)-propane, bis-(p-hydroxyphenyl)-methane, $\alpha\lambda,\alpha,\omega$-tris-(hydroxyphenyl)-alkanes, such as 1,1,2-tris-(hydroxyphenyl)-ethane, 1,1,3-tris-(hydroxyphenyl)-propane, ammonia, methylamine, ethylenediamine, N,N'-dimethyl ethylene diamine tetra- or hexa-methylene diamine, diethylenetriamine, ethanolamine, diethanolamine, oleyldiethanolamine, methyldiethanolamine, triethanolamine, aminoethylpiperazine, toluidine, o-, m- and p-phenylenediamine, 2,4- and 2,6-diaminotoluene, 2,6-diaminoparaxylene, multi-nuclear and condensed aromatic polyamines, such as naphthylene-1,4-diamine, naphthylene-1,5-diamine, benzidine, 2,2'-dichloro-4,4'-diphenyldiamine, 1-fluorene amine, 1,1-anthradiamine, 9,10-diaminophenanthrene, 4,4'-diaminoazobenzene, hydrazine, hydrazine hydrate, methylhydrazine, ethylhydrazine, propyl hydrazine, isopropylhydrazine, n-butylhydrazine, isobutyl hydrazine, tert.-butylhydrazine, butenylhydrazine, dodecylhydrazine, phenylhydrazine, tolyhydrazine, chlorophenylhydrazine, nitrophenylhydrazine, benzylhydrazine, 2-phenylethyl hydrazine, cyclohexylhydrazine, cyclopentylhydrazine, $\beta$-cycanoethylhydrazine, 1,2-dimethylhydrazine, 1,2-diethyl hydrazine, 1,2-diisobutylhydrazine, 1-butyl-2-methylhydrazine, hydrazobenzene, 1-benzyl-2-phenylhydrazine, oxalyl dihydrazine, semicarbazide, carbohydrazine, 4-methylsemicarbazide, 4-phenylsemicarbazide, isophthalic acid dihydrazide, $\beta$-hydrazinopropionic acid hydrazide, thiosemicarbazide, thiocarbohydrazide, aminoguanidine, 1-aminopiperazine and 1,4-diaminopiperazine.

All these compounds may also be reacted with alkylene oxide to form their adducts, but these also should have molecular weights below 1000 and preferably below 300.

The mixture used for producing the insecticidal preparations contain the long chain polyols and short chain compounds in proportions, by weight, of about 1 : 1 to 9 : 1 and preferably about 1.5 : 1 to 4 : 1.

The volatile insecticidal phosphoric acid esters used for producing the insecticidal preparations may be known phosphoric and/or thionophosphoric acid esters.

The following are typical examples of such active ingredients:
dimethyl-2,2-dichlorovinyl phosphate (DDVP)
dimethyl-2,2-dichlorovinyl thiophosphate
dimethyl-2-chlorovinyl phosphate
diethyl-2,2-dichlorovinyl phosphate
diethyl-2-chlorovinyl phosphate
dipropyl-2-chlorovinyl phosphate
diisopropyl-2-chlorovinyl phosphate
dibutyl-2-chlorovinyl phosphate
diisobutyl-2-chlorovinyl phosphate
dimethyl-2,2-dibromovinyl phosphate
dimethyl-2-bromovinyl phosphate
dimethyl-2-bromovinyl phosphate
dimethyl-2-bromo-2-chlorovinyl phosphate
diethyl-2-bromo-2-chlorovinyl phosphate
methyl ethyl-2,2-dichlorovinyl phosphate
dimethyl-1,2-dibromo-2,2-dichloroethyl phosphate
dimethyl-1-bromo-2,2,2-trichloroethyl phosphate
dimethyl-1,2,2,2-tetrabromoethyl phosphate
dimethyl-1,2-dibromo-2,2-dichloropropyl phosphate
dimethyl-2-chloro-1-methylvinyl phosphate
dimethyl-2-chloro-2-methylvinyl phosphate
dimethyl-2,2-dichloro-1-methylvinyl phosphate
dimethyl-2-chloro-1-ethylvinyl phosphate
dimethyl-2-chloro-2-ethylvinyl phosphate
dimethyl-2-chloro-1,2-dimethylvinyl phosphate
diethyl-2-chloro-1-methylvinyl phosphate
dimethyl-2-chlorovinyl thionophosphate
dimethyl-2-chloro-1-methylvinyl thionophosphate
dimethyl-2-chloro-2-methylvinyl thionophosphate.

The quantity of active ingredient to be used in the insecticidal products depends on the requirements to be met by the product. The proportion, by weight, of active ingredient to polymer carrier substance used, in other words to elastomeric polyurethane, is generally about 1 : 10 to 1 : 1 and preferably about 1 : 4 to 1 : 2.

Other additives, such as dyes, perfumes, bactericidal compounds, flame retardants and water-binding substances, may also be included in the insecticidal products. If desired, curing may be accelerated by known catalysts for isocyanate reactions, such as tertiary amines, silaamines, basic nitrogen compounds, alkali metal hydroxides, alkali metal phenolates, alkali metal alcoholates, hexahydrotriazines and organic metal compounds, in particular organic tin compounds, Known emulsifiers may also be used to break-up the reaction mixture.

Production of the insecticidal preparations may be carried out by various methods. If desired, all the components, that is to say the active ingredient, long chain polyol, short chain branching agent, polyisocyanates and any other additives used, may be mixed together and the mixture may then be cured. Alternatively, a preliminary reaction may first be carried out between part or all of the isocyanate and the long chain polyol and curing may then be completed only after the other components have been added. Another possibility lies in first forming the whole polyurethane elastomer and then allowing the active ingredient to diffuse into it, preferably while the elastomer is still fresh.

The process may be carried out either continuously or intermittently. In either case, mechanical stirrers which produce zones of increased turbulence are used. Good results are obtained when using high speed mixing apparatus, such as impeller homogenizers or mixing chambers with stirrers of the type used in polyurethane foaming machines which are commonly available commercially or have been described in the literature. Vigorous mixing of the components may also be achieved with the aid of the mixing devices used in polyurethane foaming machines in which mixing is carried out by a process of counterflow injection. Air or low boiling halogenated hydrocarbons, such as trichlorofluoromethane, or small quantities of, water may then also be introduced into the mixture. Any of these measures causes the insecticidal preparation to foam up so that the solid products obtained after curing have a low unit weight (kg/cm$^3$).

The insecticidal preparations may be poured or spread out to form endless webs of any thickness before they are cured. These webs may in addition be shaped. After curing, the webs may be sawn or cut into panels.

The activity of the insecticidal preparations may be enhanced by incorporating solid fillers before the mass has hardened, for example natural or synthetic fibers, such as jute, glass fibers, asbestos fibers, or stone wool.

It is particularly advantageous to cover the insecticidal preparations on one or both sides with woven or knitted fabrics or non-woven webs based on natural or synthetic fibers before they are cured or to coat one of these carrier materials on one or both sides with the insecticidal preparation before it has hardened. The thickness of the layers applied may vary within wide limits, the thickness of the layer of insecticidal preparation being generally about 2 to 20 mm.

The solid insecticidal end product may be an article of any desired shape obtained by molding or foaming in a mold.

The pesticidal activity of the preparations obtained according to the process renders them suitable for combating various types of insects including flies, gnats, cockroaches, crickets, sugar mites, fleas, nits, lice and bed bugs. The products may be used in known manner in rooms attacked by these pests or they may be attached to domestic animals.

In the following Examples which serve to further illustrate the invention, the abbreviation "DDVP" denotes O,O-dimethyl-O-(2,2-dichlorovinyl)-phosphate and "Thio-DDVP" denotes O,O-dimethyl-O-(2,2-dichlorovinyl)-thiophosphate.

EXAMPLE 1

65 parts, by weight, of diisocyanate based on 4,4'-diisocyanatodiphenylmethane and liquefied with 14% of tripropylene glycol are added all at once at room temperature to a mixture of:
22 parts, by weight, of a polyether which has been obtained by the addition of 87% of propylene oxide and 13% ethylene oxide to trimethylolpropane (OH number 35),
14 parts, by weight, of butane-1,4-diol,
0.15 parts, by weight, of phosphoric acid (100%),
0.2 parts, by weight, of dye (Colour Index No. 5 80 50) and
25 parts, by weight, of DDVP.

The two components, each of which is at a temperature of 22° C, are mixed together by mechanical stirring for one minute (speed of stirrer 1165 revs/min). The reaction mixture is then poured into an aluminum mold measuring 8 × 25 cm.

The following times are measured starting from the beginning of mixing:
1. Cream time of the reaction: 3 minutes,
2. Gel time of the reaction mass: 10 minutes,
3. Time for removal of the product from the mold: 15 minutes.

The exothermic reaction heats the resin mass to 80° C. At the point when the mass is ready for removal from the mold, its temperature is about 30° C. The chemical reaction has, however, already progressed so far at this stage that the product is sufficiently solid to be handled easily (e.g. for packaging).

The molded product containing active ingredient has a weight of 126.3 parts and the DDVP content is 25 parts, by weight.

EXAMPLE 2

51 parts, by weight, of the diisocyanate from Example 1 are added all at once at room temperature to a mixture of 18 parts, by weight, of the polyether from Example 1, 11 parts, by weight, of butane-1,4-diol, 0.2 parts, by weight, of the dye from Example 1, 0.25 parts, by weight, of phosphoric acid (100%) and 25 parts, by weight, of DDVP. The two components, each of which is at a temperature of 22° C, are mixed together by mechanical stirring for one minute (speed of stirrer 1165 revs/min). The reaction mixture is then poured into an aluminum mold measuring 8 × 25 cm.

The following times were measured from the beginning of mixing:
1. The cream time of the reaction: 3 minutes,
2. the gel time of the reaction: 5 minutes,
3. the time when the product is ready for removal from the mold: 8 minutes.

The exothermic reaction causes the resin mass to be heated to 88° C. At the time when the product is removed from the mold, its temperature is about 40° C, but the chemical reaction has by then already progressed so far that the product is sufficiently solid to be handled (e.g. for packaging). The molded product has a weight of 105.4 parts and the DDVP content is 25 parts, by weight.

EXAMPLE 3

65 parts, by weight, of the diisocyanate from Example 1 are added all at once at room temperature to a mixture of 22 parts, by weight, of a polyether from Example 1, 14 parts, by weight, of butane-1,4-diol, 0.2 parts, by weight, of the dye from Example 1, 0.15 parts, by weight, of phosphoric acid (100%) and 25 parts, by weight, of thio-DDVP. The two components, each of which is at a temperature of 27° C, are mixed together by mechanical stirring (speed of stirrer 1165 revs/min) for 1 minute. The reaction mixture is then poured into an aluminum mold measuring 8 × 25 cm.

The following times are measured from the beginning of mixing:
1. The cream time of the reaction: 7 minutes,
2. the gel time of the reaction mass: 15 minutes,
3. the time of removal of the product from the mold: 20 minutes.

The exothermic reaction causes the resin mass to be heated to 58° C. At the time when the mass is removed from the mold, its temperature is about 30° C, but the chemical reaction has by then progressed so far that the product is sufficiently solid for handling (e.g. for packaging). The molded product has a weight of 126.3 parts and the thio-DDVP content is 25 parts, by weight.

EXAMPLE 4

51 parts, by weight, of the diisocyanate from Example 1 are added all at once at room temperature to a mixture of 18 parts, by weight, of the polyether from Example 1, 11 parts, by weight of butane-1,4-diol, 0.2 parts, by weight, of the dye from Example 1, 0.15 parts, by weight, of phosphoric acid (100%) and 25 parts, by weight, of thio-DDVP. The two components, which are each at a temperature of 22° C, are mixed together by mechanical stirring for 1 minute (speed of stirring 1165 revs/min). The reaction mixture is then poured into an aluminum mold measuring 8 × 25 cm.

The following times are measured from the beginning of mixing:
1. The cream time of the reaction: 6 minutes,
2. the gel time of the reaction mass: 10 minutes,
3. the time of removal of the product from the mold: 21 minutes.

The exothermic reaction heats the resin mass to 63° C. At the moment when it is removed from the mold it is at a temperature of about 30° C, but the chemical reaction has by that time progressed so far that the product is sufficiently solid to handle (e.g. for packaging). The molded product has a weight of 105.3 parts and the proportion of thio-DDVP is 25 parts, by weight.

EXAMPLE 5 (Comparison example)

A solution is prepared from 35%, by weight, of styrene and 65%, by weight, of an unsaturated polyester which has been obtained by polycondensation of 517 parts, by weight, of maleic acid anhydride, 1805 parts, by weight, of phthalic acid anhydride, 1044 parts, by weight, of propane-1,2-diol and 605 parts, by weight, of dipropylene glycol. This solution is stabilized with 0.271 parts, by weight, of hydroquinone.

A homogeneous mixture of 182.5 parts, by weight, of the above polyester solution, 105 parts, by weight, of DDVP, 62.5 parts, by weight, of pentadecylsulfonic acid phenyl ester, 7.35 parts, by weight, of maleic acid anhydride and 11.1 parts, by weight, of benzoyl peroxide (50% solution in phthalate plasticizer) is then prepared. A plate 5 mm in thickness is then cast by pouring this reaction mixture into a mold into which a glass fiber mat (600 g/m²) has previously been placed for reinforcement and heating the mixture in the closed mold to a temperature of from 80 to 100° C for about 30 minutes. The plate is then cut up into pieces measuring 8 × 25 cm. Each piece weighs 140 parts and its proportion of DDVP is 29 parts, by weight. Its glass fiber content is 37.8 parts, by weight.

EXAMPLE 6

A solid end product obtained as described in Example 2, measuring 8 × 25 cm and weighing 105.4 g, is suspended 1 meter from the ceiling in the center of a room having a volume of 25 m³. For comparison, a piece produced as in Example 5, measuring 8 × 25 cm and weighing 140 g, is suspended in the same way in another room of the same size and shape. The piece according to the present invention contains 25 g of DDVP and the comparison piece 29 g of DDVP.

Immediately after these pieces have been suspended, 200 flies of the genus Musca domestica were let loose in each room and after one hour the flies were examined to determine the percentage which had fallen on their backs. The test was repeated after 1,4,8,12 and 14 weeks and after the insecticidal pieces had been suspended for 14 weeks they were removed and weighed. The quantity of DDVP liberated from them was then determined by difference measurements.

Table 1

| Age of end product in weeks | % knock down after 1 hour | |
|---|---|---|
| | Product according to Example 2 | Comparison product according to Example 5 |
| 0 | 80 | 80 |
| 1 | 90 | 80 |
| 4 | 95 | 80 |
| 8 | 80 | 40 |
| 12 | 70 | 20 |
| 14 | 40 | 10 |
| Loss of active ingredient in 14 weeks | 13.53 g | 11.45 g |

EXAMPLE 7

A molded product according to Example 4, measuring 8 × 25 cm and weighing 10.53 g, is suspended 1 meter from the ceiling in a room having a volume of 20 m³. In another room of the same size and shape, a product produced according to Example 5 is suspended in a similar manner for comparison. The product according to the present invention contained 25 g of active ingredient and the comparison product 29 g. Two weeks after suspension of the products and 4 weeks and 7 weeks later, 200 flies of the genus Musca domestica were released into the room in each case and observed to determine after what length of time 100% of the insects had fallen on their backs.

Table 2

| Age of end product in weeks | 100% known down after hours | |
|---|---|---|
| | End product according to Example 4 | Comparison product according to Example 5 |
| 2 | 1 | 2 |
| 4 | 1 | 2 |
| 7 | 2 | 3 |

It will be appreciated that the instant specification and examples are set forth by way of illustration and not limitation, and that various modifications and changes may be made without departing from the spirit and scope of the present invention.

What we claim is:

1. A solid insecticidal article comprising an insecticidally effective amount of at least one volatile phosphoric or thiophosphoric acid ester and about 1 to 10 times its weight of a solid elastomeric polyurethane carrier material formed from a polyisocyanate and units of a long chain polyol having a molecular weight of about 1,000 to 10,000, and of at least one of a short chain polyol and/or polyamine having a molecular weight of about 62 to 1,000, the weight ratio of units of long chain polyol to units of short chain polyol plus polyamine ranging from about 1:1 to 9:1.

2. An article as claimed in claim 1 in which the active ingredient is an O,O-dimethyl-O-(2,2-dichlorovinyl)-phosphoric or thiophosphoric acid ester.

3. An article as claimed in claim 1, in which the proportion, by weight, of active ingredient to elastomeric polyurethane is about 1:4 to 1:2.

4. An article as claimed in claim 3, in which the active ingredient is O,O-dimethyl-O-(2,2-dichlorovinyl)-phosphoric or thiophosphoric acid ester.

5. An article as claimed in claim 3, in which the active ingredient is an O,O-dimethyl-O-(2,2-dichlorovinyl)-phosphoric or thiophosphoric acid ester, the polyurethane formed from a polyisocyanate and units of a long chain polyol having a molecular weight of about 2,000 to 5,000, and of at least one of a short chain polyol and polyamine having a molecular weight of about 62 to 300, the weight ratio of units of long chain polyol to units of short chain polyol plus polyamine ranging from about 1.5:1 to 4:1.

* * * * *